(12) United States Patent
Lu et al.

(10) Patent No.: US 8,420,958 B2
(45) Date of Patent: Apr. 16, 2013

(54) POSITION APPARATUS FOR TOUCH DEVICE AND POSITION METHOD THEREOF

(75) Inventors: Cheng-Long Lu, Miaoli County (TW); Shun-Ken Huang, Hsinchu County (TW)

(73) Assignee: ITE Tech. Inc., Hsinchu (TW)

( * ) Notice: Subject to any disclaimer, the term of this patent is extended or adjusted under 35 U.S.C. 154(b) by 832 days.

(21) Appl. No.: 12/553,972

(22) Filed: Sep. 3, 2009

(65) Prior Publication Data

US 2010/0252336 A1 Oct. 7, 2010

(30) Foreign Application Priority Data

Apr. 7, 2009 (TW) ................................ 98111497 A

(51) Int. Cl.
*G06F 3/041* (2006.01)

(52) U.S. Cl.
USPC ..................... 178/18.06; 178/18.05; 345/173; 345/174; 345/177

(58) Field of Classification Search .......................... None
See application file for complete search history.

(56) References Cited

U.S. PATENT DOCUMENTS

| | | | | |
|---|---|---|---|---|
| 4,686,332 A * | 8/1987 | Greanias et al. | | 345/173 |
| 5,543,591 A * | 8/1996 | Gillespie et al. | | 178/18.03 |
| 5,790,107 A * | 8/1998 | Kasser et al. | | 345/174 |
| 5,825,352 A | 10/1998 | Bisset et al. | | |
| 5,920,309 A * | 7/1999 | Bisset et al. | | 345/173 |
| 7,061,475 B2 * | 6/2006 | Kent | | 345/177 |
| 7,109,978 B2 * | 9/2006 | Gillespie et al. | | 345/173 |
| 7,825,905 B2 * | 11/2010 | Philipp | | 345/173 |
| 8,049,732 B2 * | 11/2011 | Hotelling et al. | | 345/173 |
| 2006/0125801 A1 * | 6/2006 | Hsu et al. | | 345/173 |
| 2006/0207806 A1 * | 9/2006 | Philipp | | 178/18.05 |
| 2012/0044206 A1 * | 2/2012 | Philipp | | 345/174 |

* cited by examiner

Primary Examiner — Van Chow
(74) Attorney, Agent, or Firm — Litron Patent & Trademark Office; Min-Lee Teng

(57) ABSTRACT

A position apparatus of a touch device and a position method thereof are provided, wherein the touch device includes a plurality of scan lines. In the position method, a plurality of capacitances in the scan lines are sensed. Next, a plurality of capacitances respectively sensed in an $i^{th}$ scan line of the scan lines and a subset of the scan lines neighboring with the $i^{th}$ scan line are selected. When the capacitance sensed in the $i^{th}$ scan line is larger than each of the capacitances sensed in the subset of the scan lines, the capacitance sensed in the $i^{th}$ scan line is determined as a peak capacitance. Finally, a touch position is calculated according to the peak capacitance and the capacitances sensed in the subset of the scan lines.

16 Claims, 5 Drawing Sheets

POSITION APPARATUS FOR TOUCH DEVICE AND POSITION METHOD THEREOF

CROSS-REFERENCE TO RELATED APPLICATION

This application claims the priority benefit of Taiwan application serial no. 98111497, filed on Apr. 7, 2009. The entirety of the above-mentioned patent application is hereby incorporated by reference herein and made a part of specification.

BACKGROUND OF THE INVENTION

1. Field of the Invention

The present invention generally relates to a position apparatus and a position method thereof, and more particularly, to a position apparatus capable of enhancing accuracy of positioning a touch position and a position method thereof.

2. Description of Related Art

With the rapid development of technology, most electronic devices, such as notebook computers, mobile phones, or portable multimedia players, usually have touch panels serving as input interfaces of a new generation in replacement of conventional keyboards. The touch panels are generally classified into capacitive, resistive, infrared, and ultrasonic touch panels, wherein the resistive touch panels and the capacitive touch panels are the most common products. The capacitive touch panels are operated by approaching or touching the touch panels with a finger or a conductive material to change capacitances of the touch panels. While variations in the capacitances are detected, the location approached or touched by the finger or the conductive material is determined, and an operation corresponding to the approached or touched location is performed. The capacitive touch panels have a multi-touch feature which allows a more user-friendly operation. Therefore, the capacitive touch panels are gradually favored by the market.

In U.S. Pat. No. 5,825,352, a multiple-finger contact sensing method is provided. The multiple-finger contact sensing method includes a process for determination of a touch position according to peaks and valleys in a capacitive curve. In the above-described patent, capacitances sensed by neighboring sensors are compared in sequence, and then, positions of the peaks and the valleys are found according to a rising or falling trend of the capacitive curve. When the sensors are scanned in a single axis, such as the X-axis or the Y-axis, the detected peak values and the positions of the peaks are stored. If the peak values are greater than a reference threshold, the positions of the peaks are determined to be touched. The peak values and the neighboring valley values are calculated, so that the touch position touched by the multiple fingers on the touch panel is obtained.

However, when the touch panel is untouched, the capacitances sensed by the sensors have noises caused by variations in environmental factors. In the above-described process, the touch position is determined after the peaks and the valleys are detected. Accordingly, the capacitances due to noises are possibly considered as the peaks and then stored, and whether the positions of the peaks refer to the touch position is further determined. Meanwhile, calculating the capacitances caused by the noises not only wastes the calculation resources of the system but also results in unnecessary power consumption of the system. Moreover, in the calculating method for positioning the touch position, the centroid position obtained from the capacitances sensed by the sensors is the touch position. For some sensor, the capacitances sensed by the sensors when the touch position is in the center of the sensor are different from the capacitances sensed by the sensors when the touch position is on the edges of the sensor. Accordingly, the accuracy of positioning the touch position by calculation is affected.

SUMMARY OF THE INVENTION

One embodiment of the present invention provides a position apparatus of a touch device capable of detecting whether scan lines are in a touch state without being affected by noises to reduce the calculating load for determining the touch position. Furthermore, the position apparatus calculates a length according to capacitances sensed in the scan lines and a touch position according to the calculated length to enhance the accuracy of positioning the touch position of the touch device. A position method of the position apparatus is also provided in one embodiment of the present invention.

One embodiment of the present invention provides a position method of a touch device, wherein the touch device has a plurality of scan lines. In the position method, first, capacitances in the plurality of scan lines are sensed. Next, the capacitances respectively sensed in an $i^{th}$ scan line of the scan lines and in a subset of the scan lines neighboring with the $i^{th}$ scan line are selected. When the capacitance sensed in the $i^{th}$ scan line is larger than each of the capacitances sensed in the subset of the scan lines, the capacitance in the $i^{th}$ scan line is determined as a peak capacitance. According to the peak capacitance and the capacitances sensed in the subset of the scan lines, a touch position is calculated.

In an embodiment of the present invention, the above-described step of calculating the touch position according to the peak capacitance and the capacitances sensed in the subset of the scan lines further includes respectively calculating an $i^{th}$ length, an $(i+1)^{th}$ length, and an $(i-1)^{th}$ length according to the peak capacitance, an $(i+1)^{th}$ capacitance sensed in the subset of the scan lines, and an $(i-1)^{th}$ capacitance sensed in the subset of the scan lines, and calculating a first weighted sum of the $i^{th}$ length and a sub-length as the touch position when the $i^{th}$ length is smaller than a weighted value of the sub-length and a reference coefficient, wherein the sub-length is a maximum of the $(i-1)^{th}$ length and the $(i+1)^{th}$ length.

In an embodiment of the present invention, the step of calculating the touch position according to the peak capacitance and the capacitances sensed in the subset of the scan lines further includes calculating a second weighted sum of the $(i-1)^{th}$ length, the $i^{th}$ length, and the $(i+1)^{th}$ length as the touch position when the $i^{th}$ length is larger than or equal to the weighted value of the sub-length and the reference coefficient.

One embodiment of the present invention provides a position apparatus of a touch device, wherein the touch device has a plurality of scan lines. The position apparatus includes a multiplexer and a processing unit. The multiplexer is coupled to the touch device for selecting the capacitances respectively sensed in an $i^{th}$ scan line of the scan lines and a subset of the scan lines neighboring with the $i^{th}$ scan line. The processing unit includes a peak detector and a position detector. The peak detector is coupled to the multiplexer. The peak detector determines the capacitance sensed in the $i^{th}$ scan line is a peak capacitance when the capacitance sensed in the $i^{th}$ scan line is larger than each of the capacitances sensed in the subset of the scan lines. The position detector is coupled to the multiplexer and the peak detector. When the capacitance sensed in the $i^{th}$ scan line is the peak capacitance, the position detector calculates a touch position according to the peak capacitance and the capacitances sensed in the subset of the scan lines.

In an embodiment of the present invention, the above-described position detector respectively calculates an $i^{th}$ length, an $(i+1)^{th}$ length, and an $(i-1)^{th}$ length according to the peak capacitance, an $(i+1)^{th}$ capacitance sensed in the subset of the scan lines, and an $(i-1)^{th}$ capacitance sensed in the subset of the scan lines. When the $i^{th}$ length is smaller than a weighted value of a sub-length and a reference coefficient, the position detector calculates a first weighted sum of the $i^{th}$ length and the sub-length as the touch position, wherein the sub-length is a maximum of the $(i-1)^{th}$ length and the $(i+1)^{th}$ length.

In an embodiment of the present invention, when the $i^{th}$ length is larger than or equal to the weighted value of the sub-length and the reference coefficient, the position detector calculates a second weighted sum of the $(i-1)^{th}$ length, the $i^{th}$ length, and the $(i+1)^{th}$ length as the touch position.

In an embodiment of the present invention, the reference coefficient is related to an area of a touch tool.

The capacitances sensed in the scan lines are compared with a touch threshold to determine whether the scan lines are in a touch state, as in an embodiment consistent with the present invention. Accordingly, the unnecessary calculation caused by noises affecting the positioning is avoided, and the calculating load is reduced. Moreover, when the capacitance sensed in the scan lines is in the touch state and is the peak capacitance, the position apparatus calculates the plurality of lengths according to the capacitance sensed in the scan line and the capacitances sensed in the subset of the scan lines neighboring with the scan line and calculates the touch position according to the calculated lengths. Accordingly, the accuracy of positioning the touch position is enhanced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
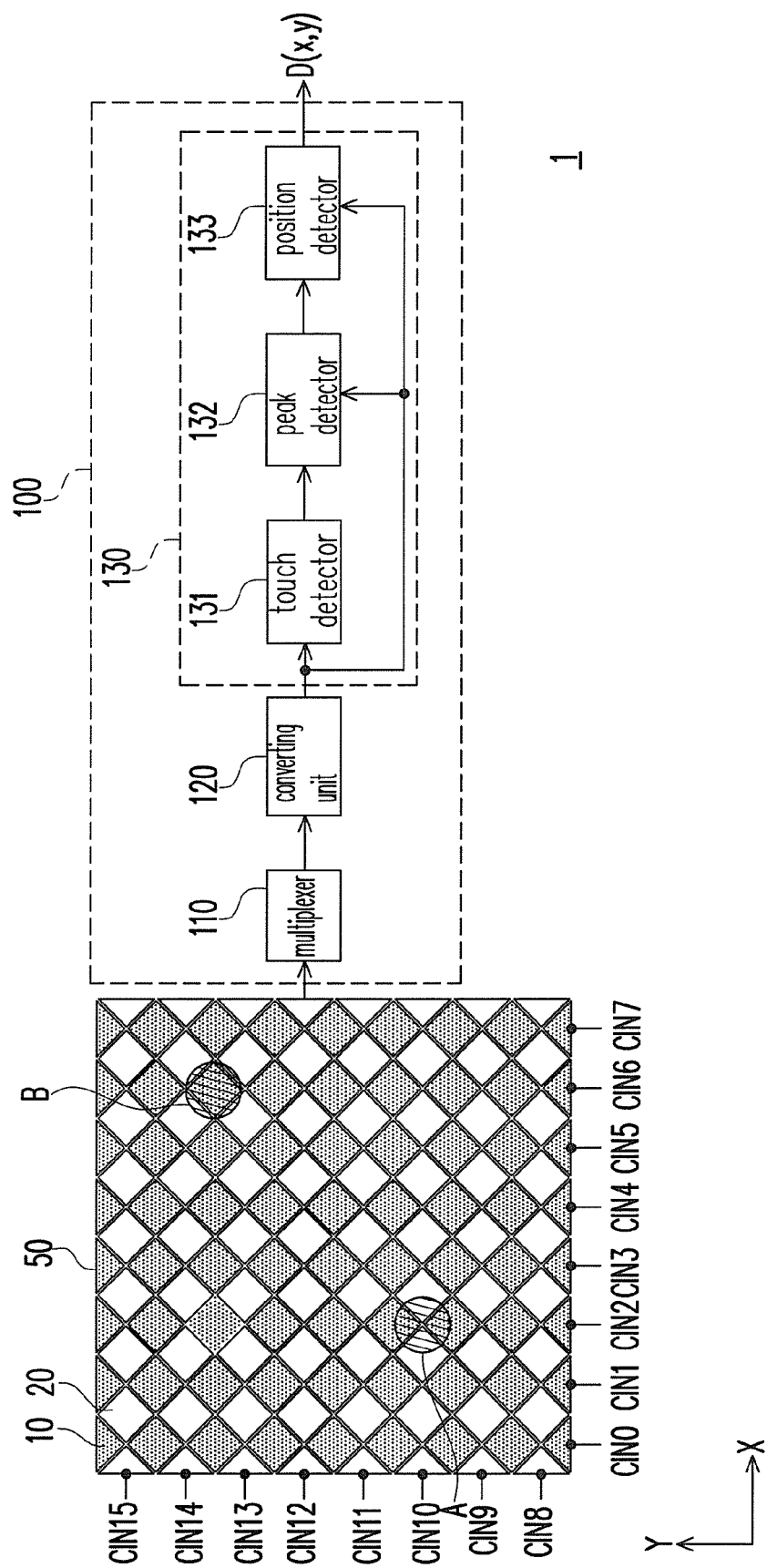
FIG. 1 is a schematic view of a touch device 1 according to an embodiment of the present invention.

FIG. 1 is a schematic view of a touch device 1 according to an embodiment of the present invention. Referring FIG. 1, the touch device 1 includes a touch panel 50 and a position apparatus 100. The touch panel 50 is a capacitive touch panel, of which diamond-shaped electrodes are arranged in a matrix, where the diamond-shaped electrodes are interleaved in the X-axis and the Y-axis. Wherein, the diamond-shaped electrodes of each of the scan lines CIN0-CIN7 in the X-axis are electrically conductive, and the diamond-shaped electrodes of each of the scan lines CIN8-CIN15 in the Y-axis are also electrically conductive. The position apparatus 100 includes a multiplexer 110, a converting unit 120, and a processing unit 130.

The multiplexer 110 is coupled to the touch panel 50. When the touch panel 50 is touched by a touch tool, such as a finger or a stylus, a coupled capacitance is generated between the diamond-shaped electrodes and the touch tool, so that capacitances sensed from some scan lines are changed. Accordingly, when the touch detection is proceeded in the touch panel 50, the multiplexer 110 sequentially drives the converting unit 120 to sense the capacitances in the scan lines according to a scan sequence. For example, according to the scan sequence CIN0→CIN1 . . . →CIN7→CIN8→CIN9 . . . →CIN15→CIN0 . . . , the capacitances in the scan lines are sequentially sensed. By detecting the X-Y coordinate of the touched position, the touched position is positioned in a two-dimension coordinate.

The converting unit 120 is an analog to digital converter (ADC), such as a capacitance to digital converter (CDC), and coupled between the multiplexer 110 and the processing unit 130. The converting unit 120 is used to convert the capacitances in an analog format to the capacitances in a digital format to be read and processed by the processing unit 130.

The processing unit 130 is a micro-controller and includes a touch detector 131, a peak detector 132, and a position detector 133. The touch detector 131 is coupled to the converting unit 120 and determines the variations of capacitances. Caused by the touch tool or the noises according to a result of comparing the capacitances sensed by the converting unit 120 with a touch threshold, so that the unnecessary calculation on the variations of capacitances caused by the noises is avoided. The peak detector 132 is coupled to the converting unit 120 and the touch detector 131. When the touch tool touches or approaches the touch panel 50, in response to the capacitances sensed in each of the scan lines, a curve with peaks and valleys is formed through the converting unit 120. In the present embodiment, the multiplexer 110 selects the capacitances respectively sensed in one of the scan lines and a subset of the scan lines neighboring with the scan line through a sliding window to proceed to determine a peak capacitance. Wherein, the sliding window shifts to one of the scan lines one by one, and when the capacitance sensed in the selected scan line is larger than each of the capacitances sensed in the subset of the scan lines, the capacitance sensed in the selected scan line is determined as a peak capacitance. The position detector 133 is coupled to the converting unit 120 and the peak detector 132. The position detector 133 determines the coordinates of the touched scan lines upon the position of the peak, and then the touch position is positioned. Generally, the coordinates of the touched scan lines, where the peak capacitance is sensed, are rather close to the touch position. Due to the size of the rhombus electrodes, the definition of the display panel is usually higher than the definition of the corresponding touch panel where the rhombus electrodes are arranged in the matrix form. The larger the size of the rhombus electrodes is, the lower the accuracy of positioning the touch position is.

Figure 2:
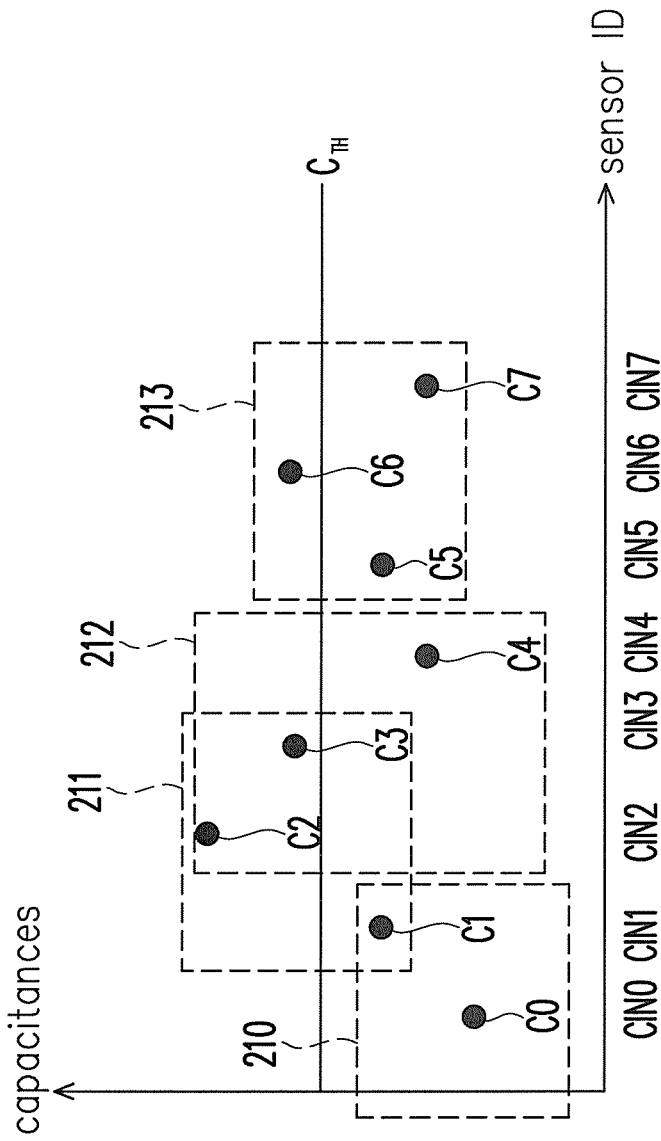
FIG. 2 is a schematic view illustrating the capacitances sensed by the converting unit 120 shown in FIG. 1.

For example, FIG. 2 is a schematic view illustrating the capacitances sensed by the converting unit 120 shown in FIG. 1. Referring to FIG. 1 and FIG. 2, when a user touches the touch panel 50 at touch positions A and B shown in FIG. 1 through a touch tool, such as a finger or a stylus, the capacitances sensed in the scan lines CIN0-CIN7 are respectively the capacitances C0-C7 shown in FIG. 2. First, a reference sliding window 210 selects the capacitance C0 sensed in the scan line CIN0 and the capacitance C1 sensed in the scan line CIN1 neighboring with the scan line CIN0. Since the capacitance C0 is smaller than a touch threshold $C_{TH}$, the touch detector 131 determines the scan line CIN0 corresponding to the sensed capacitance C0 is not in a touch state. It means that the touch position is not the position of the scan line CIN0 corresponding to the capacitance C0, so that the calculation on the capacitances C0 and C1 is unnecessary for positioning the touch position. Next, the reference sliding window 210 right shifts to the next scan line so as to select the capacitance C1 sensed in the scan line CIN1 and the capacitances, such as the capacitances C0 and C2 respectively sensed in the scan lines CIN0 and CIN2 at the two sides of the scan line CIN1, sensed in the subset of the scan lines neighboring with the scan line CIN1. Since the capacitance C1 is also smaller than the touch threshold $C_{TH}$, the touch detector 131 determines the scan line CIN1 corresponding to the sensed capacitance C1 is not in the touch state. Therefore, the calculation on the capacitances C0, C1, and C2 is unnecessary for positioning the touch position.

Thereafter, the reference sliding window 211 selects the capacitance C2 sensed in the scan line CIN2 and the capacitances C1 and C3 respectively sensed in the scan lines CIN1 and CIN3 at the two sides of the scan line CIN2. Here, the capacitance C2 is larger than the touch threshold $C_{TH}$, and the touch detector 131 determines the scan line CIN2 corresponding to the sensed capacitance C2 is in the touch state. It means that the capacitance C2 is arisen from the touch tool touching or approaching to the touch panel 50. Next, the peak detector 132 detects the capacitance C2 is larger than the neighboring capacitances C1 and C3 upon the capacitances C1-C3, so as to determine the capacitance C2 is the peak capacitance. That is, the touch position approaches or locates on the coordinate of the scan line corresponding to the capacitance C2. Similarly, through calculating the Y-coordinate of the scan line CIN10 where the touch position A is located, the touch position A is positioned in the two-dimensional coordinate D(x,y). The related operation is described in the following. The reference sliding window 212 selects the capacitance C3 sensed in the scan line CIN3 and the capacitances C2 and C4 respectively sensed in the scan lines CIN2 and CIN4 at the two sides of the scan line CIN3. Since the capacitance C3 is larger than the touch threshold $C_{TH}$, the scan line CIN3 corresponding to the capacitance C3 is determined to be in the touch state. However, according the result of comparing the capacitances C2-C4, it is known that the capacitance C3 is not the peak capacitance. It means that the touch position approaches but not locates on the coordinate of the scan line corresponding to the capacitance C3, so that the calculation on the capacitances C2-C4 for positioning the touch position does not proceed. Next, when the reference sliding window 212 right shifts to the next scan line and selects the capacitances C3, C4, and C5, and when the reference sliding window 212 further right shifts to the next scan line again and selects the capacitances C4, C5, and C6, the processing method is the same as the above-described processing method related to the capacitances C0 and C1. That is, it is unnecessary to proceed to the calculation on the selected capacitances to position the touch position because the capacitances C4 and C5 are not larger than the touch threshold $C_{TH}$.

Thereafter, the reference sliding window 213 selects the capacitance C6 sensed in the scan line CIN6 and the capacitances C5 and C7 respectively sensed in the scan lines CIN5 and CIN7 at the two sides of the scan line CIN6. Since the capacitance C6 is larger than the touch threshold $C_{TH}$ and the capacitances C5 and C7, the capacitance C6 is the peak capacitance. Accordingly, the position detector 133 determines the touch position approaches or locates on the coordinate of the scan line corresponding to the capacitance C6. The related operation is described in the following. In the present embodiment, by comparing the selected capacitances with the touch threshold $C_{TH}$ and determining whether the selected capacitance is the peak capacitance, the unnecessary calculation is avoided when the touch position is positioned, so that the calculating load is effectively reduced.

Figure 3:
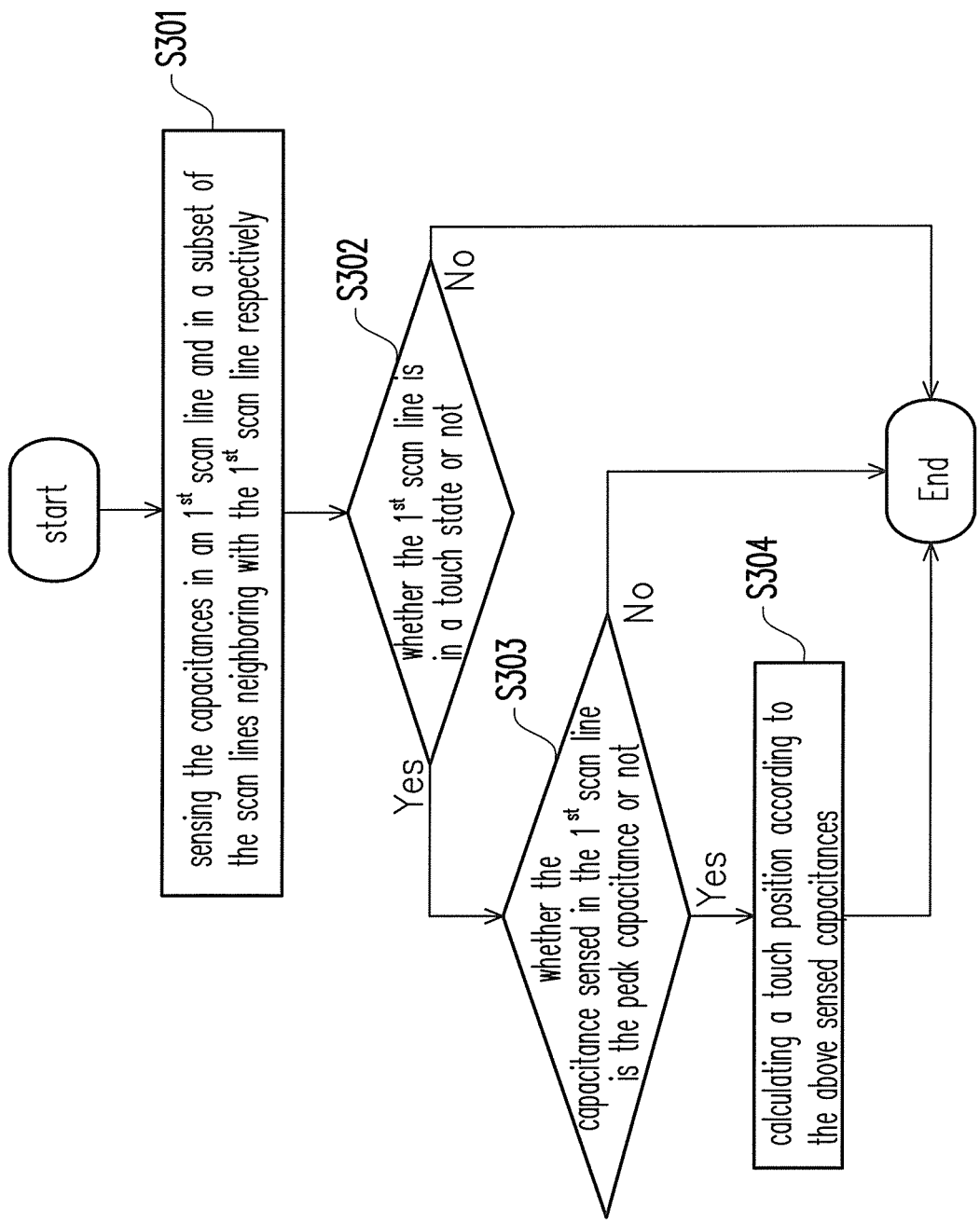
FIG. 3 is a flowchart illustrating a position method of the touch device according to an embodiment of the present invention.

According to the above description, it is summarized as the following flow. FIG. 3 is a flowchart illustrating a position method of the touch device according to an embodiment of the present invention. Referring to FIG. 3, first, the capacitances in an $i^{th}$ scan line and in a subset of the scan lines neighboring with the $i^{th}$ scan line are respectively sensed (step S301), wherein the subset of the scan lines includes an $(i-1)^{th}$ scan line and an $(i+1)^{th}$ scan line neighboring with the $i^{th}$ scan line. Next, whether the $i^{th}$ scan line is in a touch state is determined upon the capacitance sensed in the $i^{th}$ scan line and a touch threshold (step S302). Further, when the $i^{th}$ scan line is in the touch state, whether the capacitance sensed in the $i^{th}$ scan line is the peak capacitance is further determined upon the above sensed capacitances (step S303). When the capacitance sensed in the $i^{th}$ scan line is the peak capacitance, a touch position is calculated according to the above sensed capacitances (step S304). On the contrary, when the $i^{th}$ scan line is not in the touch state, or when the capacitance sensed in the $i^{th}$ scan line is not the peak capacitance, the calculation on the selected capacitances for positioning the touch position is unnecessary. The calculation performed by the position apparatus of the touch device is described in detail as following.

Figure 4:
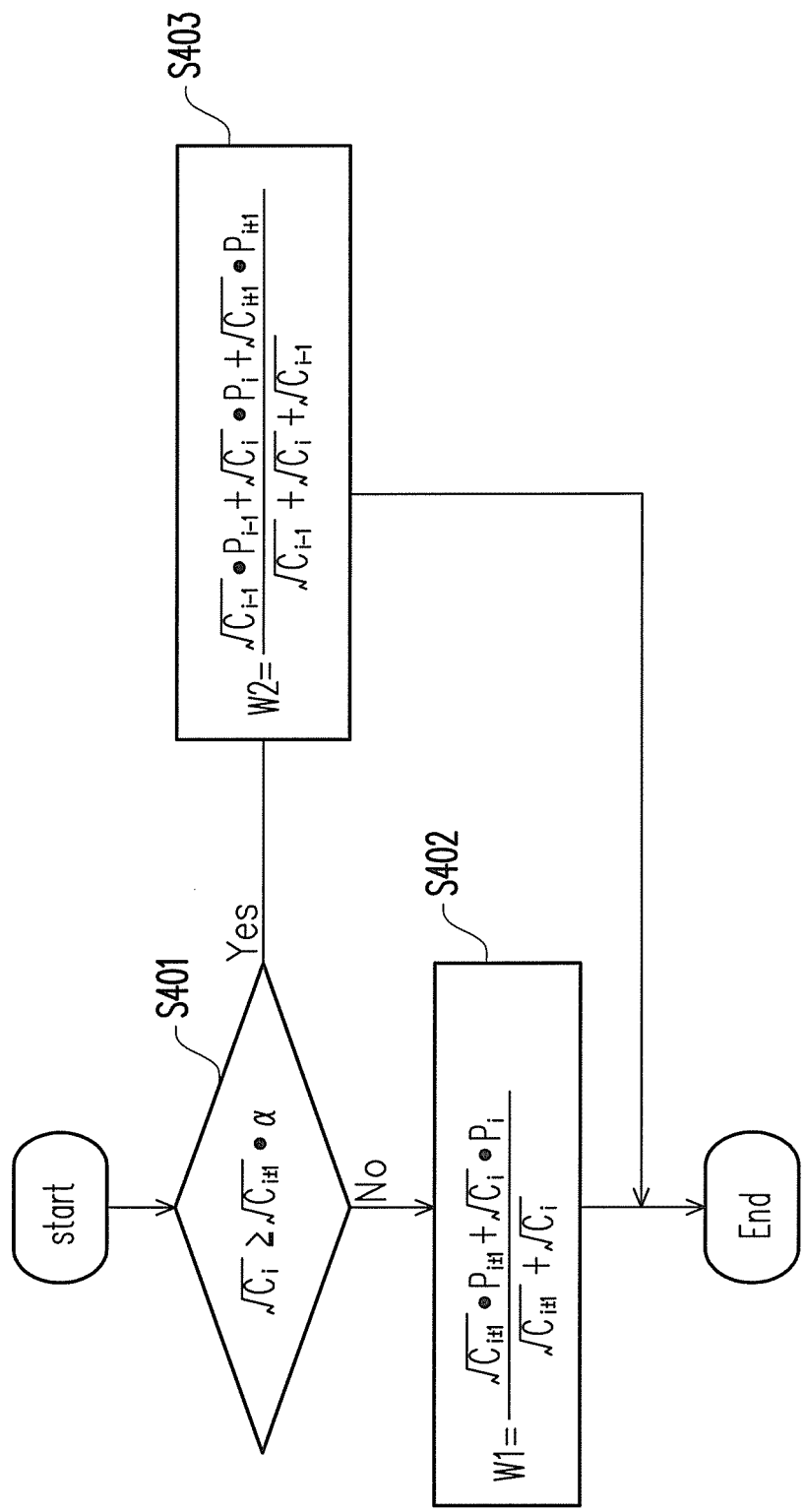
FIG. 4 is a flowchart of calculating the touch position according to the embodiment of the present invention shown in FIG. 3.

FIG. 4 is a flowchart of calculating the touch position according to the embodiment of the present invention shown in FIG. 3. Generally, the capacitance is proportional to areas where the rhombus electrode and the touch tool are coupled. Since the coordinate of the touch position corresponding to some axis is the information about a length with one dimension rather than the information about an area with two dimensions, the calculation for positioning the touch position directly proceeds, i.e. the mass-center coordinates of the touch position are calculated with the sensed capacitances corresponding to the touch position as generally proceed. The calculated touch position is usually quite different from the practical touch position. Accordingly, the position detector 133 respectively calculates lengths of capacitances $C_i$, $C_{i+1}$, and $C_{i-1}$ according to the capacitance $C_i$ sensed in the $i^{th}$ scan line and the capacitances $C_{i+1}$ and $C_{i-1}$ sensed in the subset of the scan lines, so that the touch position is positioned. For example, the length is a square root of the capacitance sensed in the scan line.

Furthermore, since the area of the touch panel 50 touched by the touch tool affects the number of the scan lines, in which the variations of the capacitances are sensed, a reference coefficient α related to the area of the touch tool is taken into consideration while the calculation for positioning the touch position proceeds in the position detector 133 so as to enhance accuracy of positioning the touch position, wherein the reference coefficient α is inversely proportional to the area of the touch tool and larger than 1. The reference coefficient α varies due to the circuit design and the circuit layout. As for the stylus, the reference coefficient α, for example, is 1.4, and as for the stylus, of which the area is larger than the finger, for example, is 1.15.

The capacitances C1-C3 selected by the reference sliding window 211 are taken as examples. The position detector 133 respectively calculates the lengths $\sqrt{C1}$, $\sqrt{C2}$, and $\sqrt{C3}$ of the capacitances C1-C3 according to the capacitance C2 and the capacitances C1 and C3 neighboring with the capacitance C2, wherein the capacitance C2 is the peak capacitance, and the capacitance C3 is next to the capacitance C2; that is, the capacitance C2 is larger than the capacitance C1. Next, the position detector 133 compares the length $\sqrt{C2}$ with a weighted value calculated from the length $\sqrt{C3}$ and the reference coefficient α (step S401), wherein a length $\sqrt{C_{i\pm 1}}$ shown in FIG. 4 is the length calculated from the capacitance smaller than the peak capacitance, and the calculated length may be the length $\sqrt{C_{i+1}}$ or the length $\sqrt{C_{i-1}}$ upon actual conditions.

When the length $\sqrt{C2}$ is smaller than the weighted value calculated from the length $\sqrt{C3}$ and the reference coefficient α, it means that the touch region in the touch panel 50 may include the scan lines corresponding to the capacitances C2 and C3. Accordingly, the position detector 133 calculates a first weighted sum W1 of the lengths $\sqrt{C2}$ and $\sqrt{C3}$ as the touch position (step S402), wherein $P_i$ is an index of a position where the scan line corresponding to the capacitance $C_i$ is located in the touch device. On the contrary, when the length $\sqrt{C2}$ is larger than or equal to the weighted value calculated from the length $\sqrt{C3}$ and the reference coefficient α, it means that the touch region in the touch panel 50 may include the scan lines corresponding to the capacitances C1-C3. Accordingly, the position detector 133 calculates a second weighted sum W2 of the lengths $\sqrt{C1}$, $\sqrt{C2}$, and $\sqrt{C3}$ as the touch position (step S403).

Figure 5:
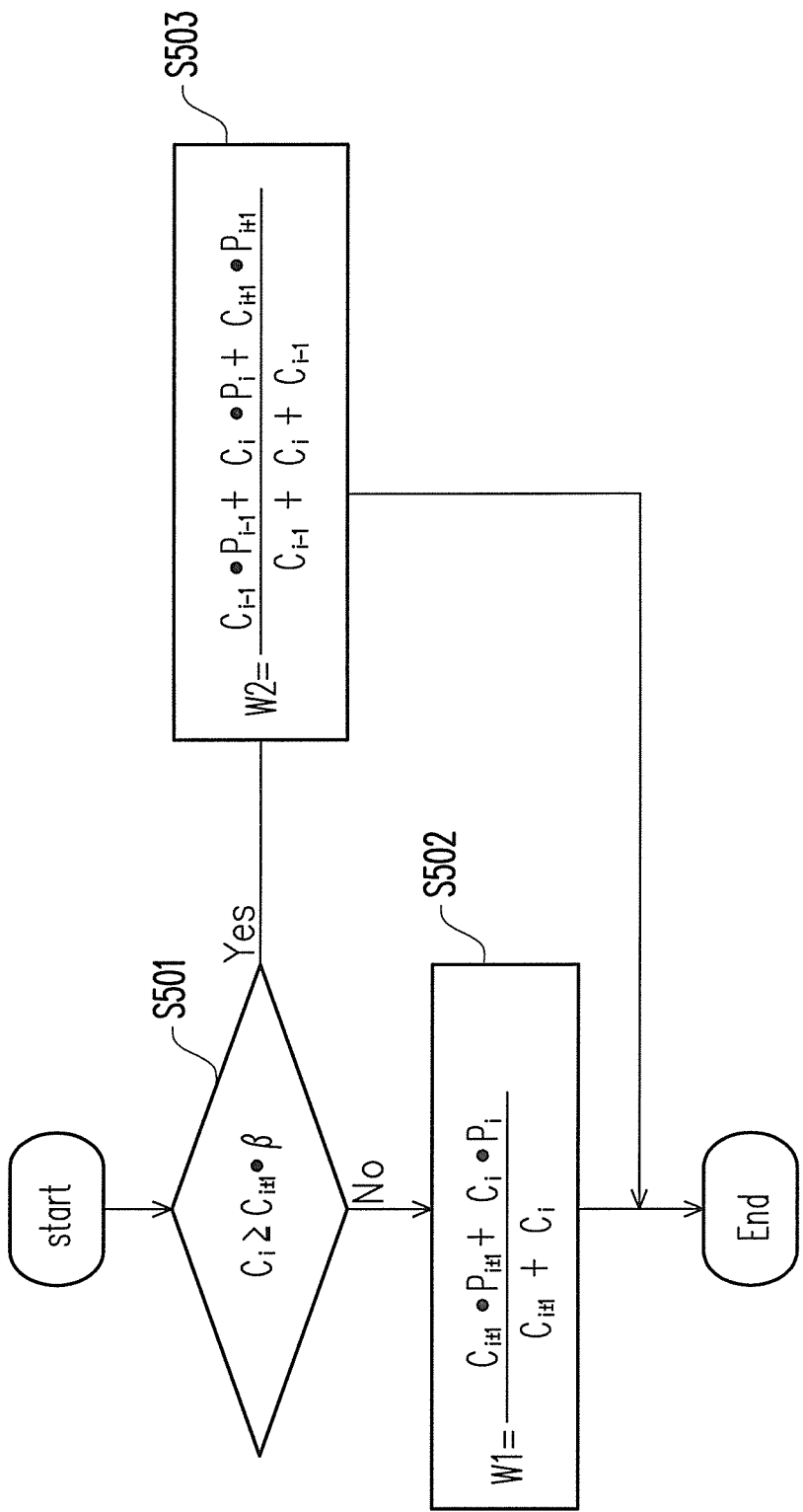
FIG. 5 is another flowchart of calculating the touch position according to the embodiment of the present invention shown in FIG. 3.

Moreover, it is described in the following embodiment that the weighted sum is calculated as the touch position according to the capacitances. FIG. 5 is another flowchart of calculating the touch position according to the embodiment of the present invention shown in FIG. 3. Referring to FIG. 5, the position detector 133 compares the capacitance C2 with a weighted value calculated from the capacitance C3 and the reference coefficient β (step S501), where the reference coefficient β may be different the reference coefficient α, for example, the reference coefficient β may be a square of the reference coefficient α. When the capacitance C2 is smaller than the weighted value calculated from the capacitance C3 and the reference coefficient β, the position detector 133 calculates a first weighted sum W1 of the capacitances C2 and C3 as the touch position (step S502), wherein $P_i$ is an index of a position where the scan line corresponding to the capacitance $C_i$ is located in the touch device. On the contrary, when the capacitance C2 is larger than or equal to the weighted value calculated from the capacitance C3 and the reference coefficient β, the position detector 133 calculates a second weighted sum W2 of the capacitances C1, C2, and C3 as the touch position (step S503).

To sum up, the capacitances sensed in the scan lines are compared with the touch threshold to determine whether the scan line is in the touch state in the above-described embodiments consistent with the present invention. Besides, when the capacitances sensed in the scan lines that are in the touch state are the peak capacitance, the lengths of the capacitances are calculated according to the capacitances sensed in the scan line and the subset of the scan lines neighboring with the scan line, so that the touch position is calculated according to the calculated lengths or the capacitances sensed in the scan line and the subset of the scan lines neighboring with the scan line.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A position method of a touch device, wherein the touch device has a plurality of scan lines, the position method comprising:
   sensing a plurality of capacitances in the scan lines;
   selecting the capacitances respectively sensed in an $i^{th}$ scan line of the scan lines and a subset of the scan lines neighboring with the $i^{th}$ scan line;
   determining the capacitance sensed in the $i^{th}$ scan line is a peak capacitance when the capacitance sensed in the $i^{th}$ scan line is larger than each of the capacitances sensed in the subset of the scan lines; and
   calculating a touch position according to the peak capacitance and the capacitances sensed in the subset of the scan lines, comprising:
   respectively calculating an $i^{th}$ length, an $(i+1)^{th}$ length, and an $(i-1)^{th}$ length according to the peak capacitance, an $(i+1)^{th}$ capacitance sensed in the subset of the scan lines, and an $(i-1)^{th}$ capacitance sensed in the subset of the scan lines; and
   calculating a first weighted sum of the $i^{th}$ length and a sub-length as the touch position when the $i^{th}$ length is smaller than a weighted value of the sub-length and a reference coefficient, wherein the sub-length is a maximum of the $(i-1)^{th}$ length and the $(i+1)^{th}$ length.

2. The position method as claimed in claim 1, wherein the reference coefficient is related to an area of a touch tool.

3. The position method as claimed in claim 2, wherein the reference coefficient is larger than 1, and the reference coefficient is inversely proportional to the area of the touch tool.

4. The position method as claimed in claim 1, wherein the first weighted sum is W1=$(\sqrt{C_{i\pm 1}} \times P_{i\pm 1} + \sqrt{C_i} \times P_i)/(\sqrt{C_{i\pm 1}} + \sqrt{C_i})$, where $\sqrt{C_{i\pm 1}}$ is the sub-length, $\sqrt{C_{i-1}}$, $\sqrt{C_i}$, and $\sqrt{C_{i+1}}$ are respectively the $(i-1)^{th}$ length, the $i^{th}$ length, and the $(i+1)^{th}$ length, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

5. The position method as claimed in claim 1, wherein the step of calculating the touch position according to the peak capacitance and the capacitances sensed in the subset of the scan lines further comprises:
   calculating a second weighted sum of the $(i-1)^{th}$ length, the $i^{th}$ length, and the $(i+1)^{th}$ length as the touch position when the $i_{th}$ length is larger than or equal to the weighted value of the sub-length and the reference coefficient.

6. The position method as claimed in claim 5, weighted sum is W2=$(\sqrt{C_{i-1}} \times P_{i-1} + \sqrt{C_i} \times P_i + \sqrt{C_{i+1}} \times P_{i+1})/(\sqrt{C_{i-1}} + \sqrt{C_i} + \sqrt{C_{i+1}})$, wherein $\sqrt{C_{i-1}}$, $\sqrt{C_i}$, and $\sqrt{C_{i+1}}$ are respectively the $(i-1)^{th}$ length, the $i^{th}$ length, and the $(i+1)^{th}$ length, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

7. A position method of a touch device, wherein the touch device has a plurality of scan lines, the position method comprising:
   sensing a plurality of capacitances in the scan lines;
   selecting the capacitances respectively sensed in an $i^{th}$ scan line of the scan lines and a subset of the scan lines neighboring with the $i^{th}$ scan line;
   determining the capacitance sensed in the $i^{th}$ scan line is a peak capacitance when the capacitance sensed in the $i^{th}$ scan line is larger than each of the capacitances sensed in the subset of the scan lines; and calculating a touch position according to the peak capacitance and the capacitances sensed in the subset of the scan lines, comprising:

calculating a first weighted sum of the peak capacitance and a sub-capacitance as the touch position when the $i^{th}$ capacitance is smaller than a weighted value of a sub-capacitance and a reference coefficient, wherein the sub-capacitance is a maximum of the $(i-1)^{th}$ capacitance and the $(i+1)^{th}$ capacitance.

8. The position method as claimed in claim 7, wherein the first weighted sum is $W1=(C_{i\pm1}\times P_{i\pm1}+C_i\times P_i)/(C_{i\pm1}+C_i)$, where $C_{i\pm1}$ is the sub-capacitance, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

9. The position method as claimed in claim 7, wherein the step of calculating the touch position according to the peak capacitance and the capacitances sensed in the subset of the scan lines further comprises:

calculating a second weighted sum of the peak capacitance, the $i_{th}$ capacitance, and the $(i+1)_{th}$ capacitance as the touch position when the $i_{th}$ capacitance is larger than or equal to the weighted value of the sub-capacitance and the reference coefficient.

10. The position method as claimed in claim 9, wherein the second weighted sum is $W2=(C_{i-1}\times P_{i-1}+C_i\times P_i+C_{i+1}\times P_{i+1})/(C_{i-1}+C_i+C_{i+1})$, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

11. A position apparatus of a touch device, wherein the touch device has a plurality of scan lines, the position apparatus comprising:

a multiplexer coupled to the touch device for selecting capacitances respectively sensed in an $i_{th}$ scan line of the scan lines and a subset of the scan lines neighboring with the $i_{th}$ scan line; and a processing unit, comprising:

a peak detector coupled to the multiplexer and determining the capacitance sensed in the $i_{th}$ scan line is a peak capacitance when the capacitance sensed in the $i_{th}$ scan line is larger than each of the capacitances sensed in the subset of the scan lines; and a position detector coupled to the multiplexer and the peak detector and calculating a touch position according to the peak capacitance and the capacitances sensed in the subset of the scan lines when the capacitance sensed in the $i_{th}$ scan line is the peak capacitance, wherein the position detector respectively calculates an $i^{th}$ length, an $(i+1)^{th}$ length, and an $(i-1)^{th}$ length according to the peak capacitance, an $(i+1)^{th}$ capacitance sensed in the subset of the scan lines, and an $(i-1)^{th}$ capacitance sensed in the subset of the scan lines, and the position detector calculates a first weighted sum of the $i^{th}$ length and a sub-length as the touch position when the $i^{th}$ length is smaller than a weighted value of the sub-length and a reference coefficient, wherein the sub-length is a maximum of the $(i-1)^{th}$ length and the length.

12. The position apparatus as claimed in claim 11, wherein the reference coefficient is related to an area of a touch tool.

13. The position apparatus as claimed in claim 12, wherein the reference coefficient is larger than 1, and the reference coefficient is inversely proportional to the area of the touch tool.

14. The position apparatus as claimed in claim 11, wherein the first weighted sum is $W1=(\sqrt{C_{i\pm1}}\times P_{i\pm1}+\sqrt{C_i}\times P_i)/(\sqrt{C_{i\pm1}}+\sqrt{C_i})$, wherein $\sqrt{C_{i\pm1}}$ is the sub-length, $\sqrt{C_{i-1}}$, $\sqrt{C_{i+1}}$, and $\sqrt{C_i}$ are respectively the $(i-1)^{th}$ length, the $(i+1)^{th}$ length, and the $i^{th}$ length, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

15. The position apparatus as claimed in claim 11, wherein the position detector calculates a second weighted sum of the (i−1).sup.th length, the i.sup.th length, and the (i+1).sup.th length as the touch position when the i.sup.th length is larger than or equal to the weighted value of the sub-length and the reference coefficient.

16. The position apparatus as claimed in claim 15, wherein the second weighted sum is $W2=(\sqrt{C_{i-1}}\times P_{i-1}+\sqrt{C_i}\times P_i+\sqrt{C_{i+1}}\times P_{i+1})/(\sqrt{C_{i-1}}+\sqrt{C_i}+\sqrt{C_{i+1}})$, wherein $\sqrt{C_{i-1}}$, $\sqrt{C_i}$, and $\sqrt{C_{i+1}}$ are respectively the $(i-1)^{th}$ length, the $i^{th}$ length, and the $(i+1)^{th}$ length, and $P_{i-1}$, $P_i$, and $P_{i+1}$ are respectively indices of positions where the scan lines corresponding to the $(i-1)^{th}$ capacitance $C_{i-1}$, the peak capacitance $C_i$, and the $(i+1)^{th}$ capacitance $C_{i+1}$ are located in the touch device.

* * * * *